US006637803B2

(12) United States Patent
Moreau

(10) Patent No.: US 6,637,803 B2
(45) Date of Patent: Oct. 28, 2003

(54) MOTOR VEHICLE DOOR DRIVE MECHANISM, WITH CORRESPONDING DOOR, CARRIAGE AND VEHICLE

(75) Inventor: Stephane Moreau, Cravant-les-Coteaux (FR)

(73) Assignee: Wagon Automotice SNC, Bressuire Cedex (FR)

( * ) Notice: Subject to any disclaimer, the term of this patent is extended or adjusted under 35 U.S.C. 154(b) by 0 days.

(21) Appl. No.: 10/186,278

(22) Filed: Jun. 27, 2002

(65) Prior Publication Data

US 2003/0005640 A1 Jan. 9, 2003

(30) Foreign Application Priority Data

Jun. 27, 2001 (FR) .......................................... 01 08542

(51) Int. Cl.$^{7}$ .................................................. B60J 5/06

(52) U.S. Cl. ...................... 296/155; 296/146.5; 49/138; 49/139

(58) Field of Search .............................. 296/155, 146.4, 296/147; 49/360, 118, 139, 362, 280, 358, 352, 349, 348, 325, 277; 340/825.69; 292/201

(56) References Cited

U.S. PATENT DOCUMENTS

| | | | | | |
|---|---|---|---|---|---|
| 2,552,356 | A | | 5/1951 | Weigele | 268/1 |
| 3,834,081 | A | | 9/1974 | Catlett | 49/360 |
| 4,162,591 | A | * | 7/1979 | Madland et al. | 49/277 |
| 4,741,219 | A | | 5/1988 | Wiand et al. | 74/104 |
| 4,932,715 | A | * | 6/1990 | Kramer | 296/156 |
| 5,046,283 | A | * | 9/1991 | Compeau et al. | 49/138 |
| 5,063,710 | A | * | 11/1991 | Schap | 49/139 |
| 5,323,570 | A | * | 6/1994 | Kuhlman et al. | 49/138 |
| 5,377,448 | A | * | 1/1995 | Boyd et al. | 49/139 |
| 5,389,920 | A | * | 2/1995 | DeLand et al. | 340/825.69 |
| 5,483,769 | A | * | 1/1996 | Zweili | 49/118 |
| 5,548,930 | A | * | 8/1996 | Morando | 296/146.5 |
| 5,913,563 | A | * | 6/1999 | Watanabe et al. | 296/155 |
| 6,134,837 | A | * | 10/2000 | Kawanobe et al. | 49/360 |
| 6,226,925 | B1 | * | 5/2001 | Shimura et al. | 49/139 |
| 6,328,374 | B1 | * | 12/2001 | Patel | 296/155 |
| 6,382,686 | B1 | * | 5/2002 | Ishigaki et al. | 292/201 |
| 6,386,621 | B1 | * | 5/2002 | Kozak et al. | 296/155 |
| 6,390,535 | B1 | * | 5/2002 | Chapman | 296/155 |
| 6,408,572 | B1 | * | 6/2002 | Uchimura et al. | 49/352 |
| 6,530,619 | B2 | * | 3/2003 | Fukumoto et al. | 296/155 |

FOREIGN PATENT DOCUMENTS

| | | |
|---|---|---|
| DE | 43 41 153 A1 | 6/1995 |
| EP | 0 937 853 A2 | 8/1999 |
| GB | 1 439 940 | 6/1976 |

* cited by examiner

*Primary Examiner*—Kiran Patel
(74) *Attorney, Agent, or Firm*—Westman, Champlin & Kelly, P.A.

(57) ABSTRACT

The invention relates to a drive mechanism for a motor vehicle sliding door, said door being integral with at least one driven arm having a sliding zone in which a pin integral with a drive element is able to slide so that said door may tack and slide between a closed position, in the vehicle bodywork plane, and an open position, in a plane approximately parallel to said bodywork plane.

17 Claims, 2 Drawing Sheets

MOTOR VEHICLE DOOR DRIVE MECHANISM, WITH CORRESPONDING DOOR, CARRIAGE AND VEHICLE

FIELD OF THE INVENTION

The field of the invention is that of openings for motor vehicles (cars of all types, commercial vehicles, lorries, coaches, etc.). More exactly, the invention relates to slide-open components, in particular motor-drive sliding doors.

BACKGROUND OF THE INVENTION

Vehicles with sliding doors have been known for some time. They are often commercial vehicles or vehicles of the "people carrier" type. A sliding door must, when it is open, move in a plane approximately parallel to the bodywork plane. Therefore a tacking and sliding movement is generally provided, so as to allow the change in plane, when opening and closing.

To this end, a guide rail is installed which has a portion parallel to the vehicle edge (corresponding to the actual sliding) and a portion coming back in towards the vehicle (corresponding to the tacking).

It seems desirable for the opening and closing of such a door to be motor-driven, for reasons of comfort, efficiency and ergonomics. This may particularly allow opening and closing to be remote-controlled, and these opening and closing operations to be carried out easily even when the user has his arms full.

Different technologies allowing such motorization have been proposed, particularly using rack and pinion drive systems.

Generally speaking, a number of drawbacks have been observed with these known techniques. In particular, they are complicated to implement, and require a number of adjustments when being fitted into a vehicle. This involves slowing down the production line and the intercession of qualified personnel, and therefore additional vehicle manufacturing cost which clearly is not desirable (particularly in respect of top-of-the-range vehicles).

Moreover, the means employed (rack and pinion systems, actuators, etc.) are heavy, cumbersome and expensive. As a result, they can only be employed in specific vehicles of sufficient size.

The particular objective of the invention is to overcome these various drawbacks of the prior art.

More exactly, an objective of the invention is to provide sliding door drive technology, and a carriage and/or a corresponding sliding door, which are simple to assemble in a vehicle, without the need for adjustments or any special equipment.

Another objective of the invention is to provide such technology, which must be simple to realise and to implement.

Yet another objective of the invention is to provide such technology which has a smaller weight and height requirement.

A particular objective of the invention is to provide such technology, which is adapted to motor vehicles which are small in size (when compared to commercial vehicles or people carriers).

SUMMARY OF THE INVENTION

These objectives, and others which will appear subsequently, are met by means of a drive mechanism for a motor vehicle sliding door. According to the invention, said door is integral with at least one driven arm having a sliding zone in which a pin integral with a drive element is able to slide, in such a way that said door is able to tack and slide between a closed position, in the vehicle bodywork plane, and an open position, in a plane approximately parallel to said bodywork plane.

A very straightforward and efficient mechanism is thus obtained: moving the pin in a sliding motion allows the kinetics required for the door to be obtained, with a drive simplified by the driven element.

To advantage, said drive element is a cable tensioned between two pulleys, and driven by motorization means. As will be seen subsequently, this provides easy assembly and reduces weight.

According to a preferential embodiment, said motorization means rotate, in both directions, a coil extending approximately perpendicular to said bodywork plane, and around which said cable is wound and unwound over a sufficient number of revolutions to provide the opening and closing of said door.

To advantage, at least one of said pulleys is mounted on a tensioning device, in order to ensure cable tension above a pre-set threshold.

According to an advantageous embodiment of the invention, said sliding zone is an oblong orifice.

In this event, said pin may include at least one screw and one nut, acting to grip said cable. According to another approach, said pin includes at least one housing for receiving a cable head mounted at one end of said cable.

Preferentially, said sliding zone extends approximately perpendicular to said bodywork plane.

The mechanism includes to advantage a guide rail, in which at least one carriage integral with said door is able to travel. Preferentially, said carriage includes at least one guide roller and/or at least one track roller.

To advantage, said carriage includes at least one element interlocking with said door, allowing said door to be assembled during construction of the vehicle. Preferentially, said interlocking element engages with a coupling element of said driven arm.

According to a particular aspect of the invention, said rail is to advantage fixed, at one of its ends, to a support element provided to carry motorization means and/or at least one first pulley.

Preferentially, said guide rail is fixed, at its other end, to at least one second pulley.

In this way, the drive mechanism of the invention forms to advantage a monobloc assembly ready to be fitted in a vehicle, with no need for adjustment.

The invention also concerns the processes of manufacturing and fitting a drive mechanism of this kind for a motor vehicle sliding door, and said door.

According to a first mode of implementation, a process of this type includes the following stages:

- making, in a monobloc form, a drive mechanism including a guide rail, motorization means and drive means;
- adjustment, if necessary, of said motorization means and/or said drive means;
- making a door, or a carriage block provided to be fixed to said door, having at least one driven arm having a sliding zone;
- fixing of said monobloc drive mechanism to the bodywork;

assembly on at least one guide rail of said door or of said carriage block previously fixed to said door;

assembly of a pin integral with a drive element driven by said motorization means in said sliding zone.

In this way assembly on the vehicle assembly line is made very straightforward.

According to a second embodiment, also very effective, the process includes the following stages:

making, in a monobloc form, a drive mechanism including a guide rail, motorization means, drive means and at least one driven arm having a sliding zone, a pin integral with a drive element driven by said motorization means able to slide in said sliding zone;

adjustment, if necessary, of said motorization means and/or said drive means;

making a door equipped with a carriage block;

fixing of said monobloc drive mechanism to the bodywork;

assembly of said door on at least one guide rail and fixing to said driven arm or arms.

The invention also relates to motor vehicle sliding doors, including at least one driven arm designed to engage with a drive mechanism as described above, as well as carriage blocks including at least one driven arm designed to engage with a drive mechanism of this kind, and provided so as to be fixed to a motor vehicle sliding door.

Finally, the invention further relates to motor vehicles including at least one drive mechanism as presented above.

BRIEF DESCRIPTION OF THE DRAWINGS

Other characteristics and advantages of the invention will emerge more clearly from reading the following description of a preferential embodiment of the invention, given as a straightforward illustrative and non-restrictive example, and the appended drawings among which.

DETAILED DESCRIPTION OF PREFERRED EMBODIMENTS

The invention therefore relates to motor-driven drive technology for a sliding door for motor vehicles of all types, and particularly small-size and/or low-cost vehicles.

As already mentioned, one of the difficulties encountered in making the drive mechanism is that the door must be able to move in two directions (tacking): during opening, the door must firstly move away from the bodywork plane, while sliding, then continue to slide along the latter. Door closure is based on the reverse movement.

The relevant guiding is generally provided by three guide rails (a lower rail, a central rail and an upper rail). Specific drive means are provided, when opening and closing are motor-driven. The invention particularly relates to the making of this drive, as well as the very simplified assembly of the drive unit and the door.

Figure 1:
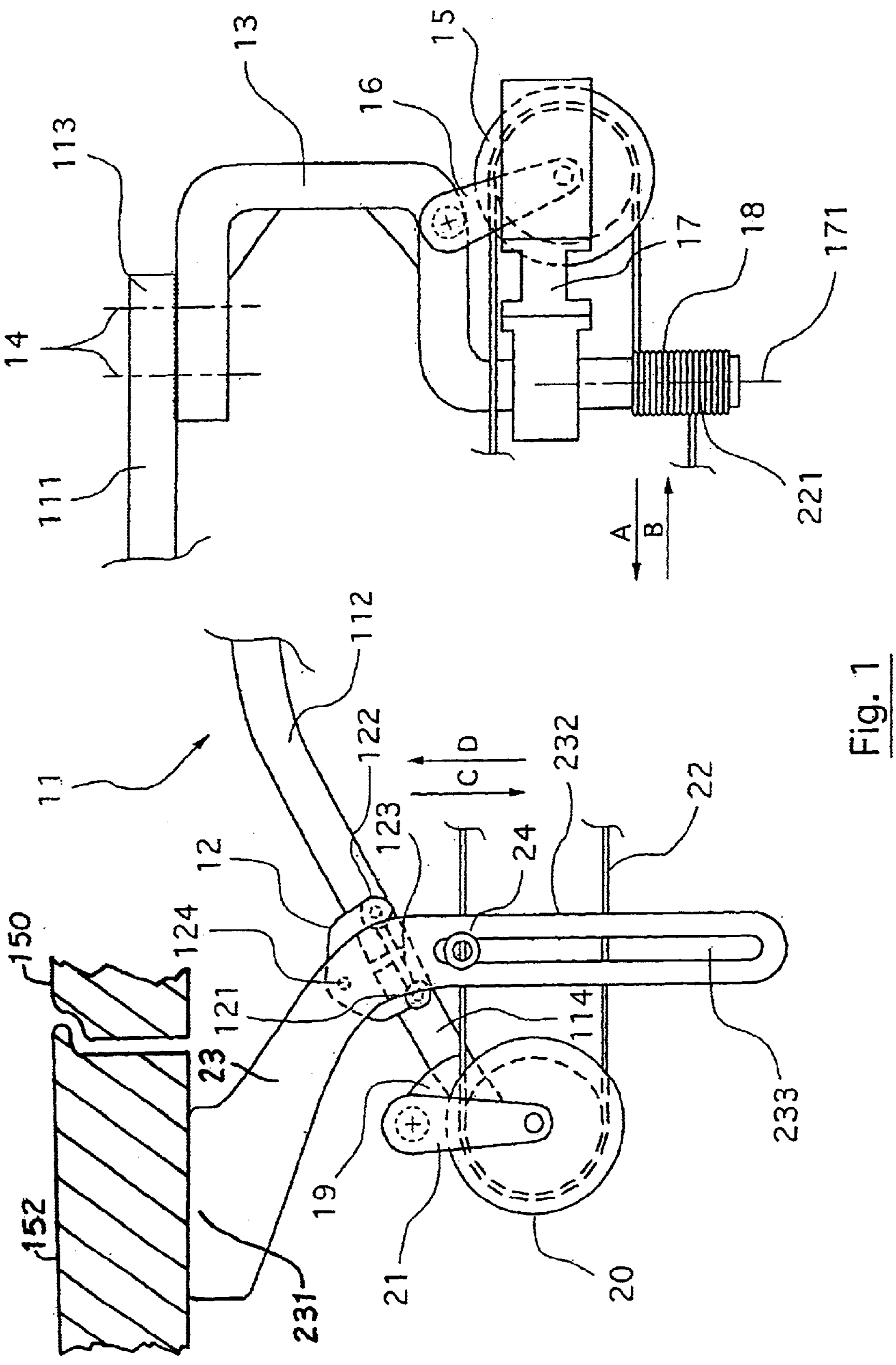
FIG. 1 shows a view from above of a sliding door drive means according to the invention, in the closed position.
Figure 2:
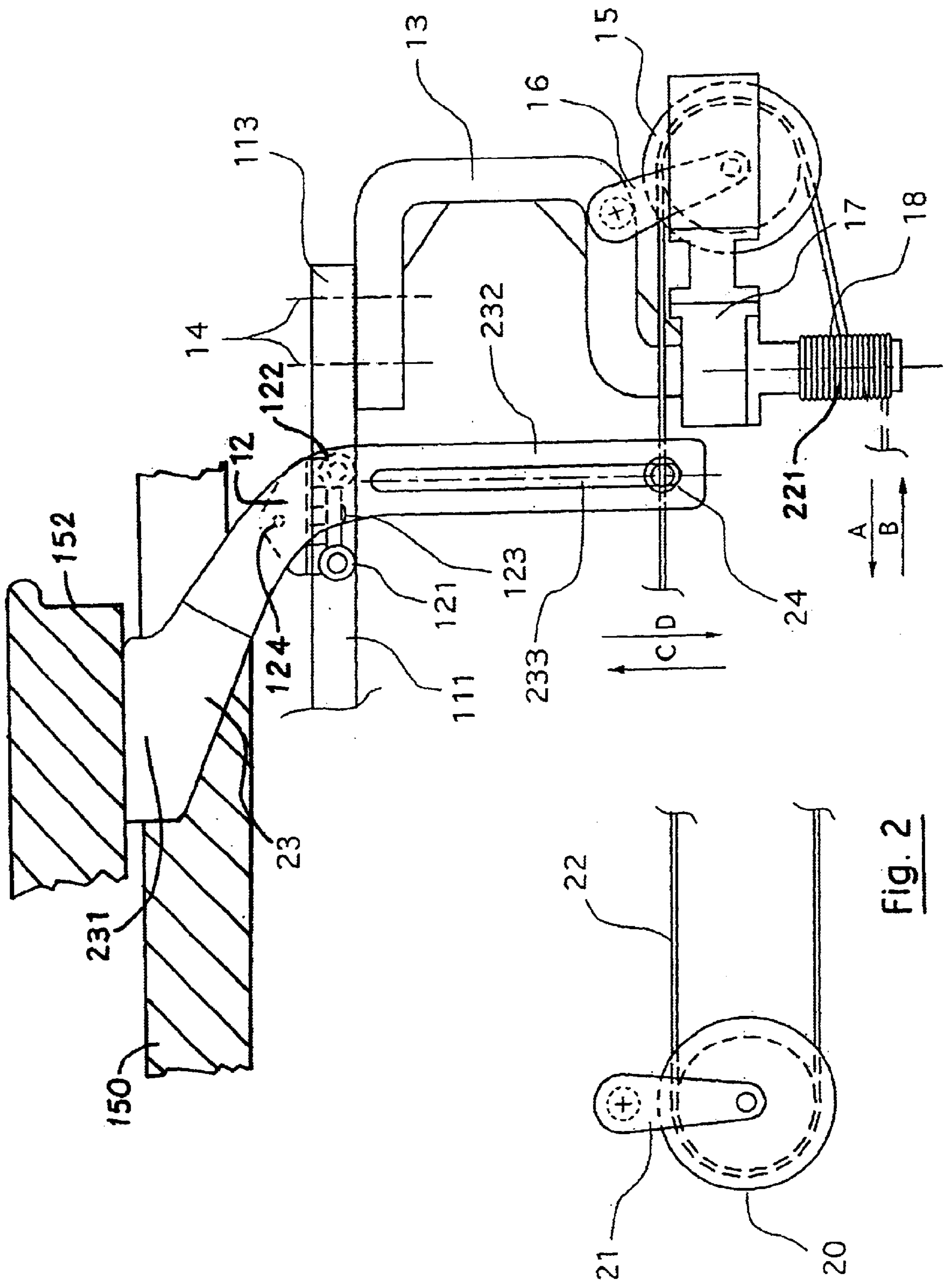
FIG. 2 shows the drive means of FIG. 1, in the open position.

FIG. 1 shows, in a view from above, an embodiment of the invention, when the door 152 is in the closed position in the plane of the bodywork 150. FIG. 2 shows the same mechanism, when the door is in the open position.

The mechanism of the invention is made in the form of a monobloc assembly, ready to be assembled and to receive a door, without adjustment or assembly on the assembly line.

It includes a lower rail 11, having a rectilinear part 111 extending parallel to the bodywork plane, and therefore to the door plane. These planes are horizontal in the figures. The door, not shown, is integral with the coupling part 231 of the component 23 in the shape of a hockey stick, described in more detail below.

This rectilinear part 111, interrupted in FIG. 1, extends over several tens of centimetres. It corresponds to the sliding of the door along the bodywork. It is extended by a part 112 coming back towards the inside of the vehicle, so as to provide the tacking of the door.

The rail 11 receives a carriage 12, able to move in this rail. The carriage 12 has two guide rollers 121 and 122 and a track roller 123, so as to guide the door accurately and easily, despite its weight. Other types of carriages may of course be provided.

At one of the ends 113 of the rail 11 is fixed a support component 13. This fixing is for example provided by means of two nuts 14 welded onto the rail 11. This support component 13 has here the general shape of a question mark, but other shapes are of course conceivable.

It carries, on the one hand, a first pulley 15, by means of a tensioning device 16 mounted on the support component, and a geared motor 17 whose output axis 171 which extends perpendicular to the plane of the above-mentioned bodywork, carries a coil 18. The geared motor 17 may drive the coil 18 in the two directions, which correspond to the opening and closing of the door respectively.

At the other end 114 of the rail 11 is fixed a shell 19 which carries a second pulley 20, by means of a tensioning device 21.

A cable 22 is mounted between the two pulleys 15 and 20. A minimum pre-set tension is provided by the tensioning devices 16 and 21. The cable 22 makes a number of revolutions 221 around the coil 18. It may for example be a stepped coil, the cable unwinding on one side and winding on the other, and conversely, along the direction of rotation transmitted by the geared motor. The number of revolutions corresponds, at least, to the length of cable necessary to provide the opening and closing.

The mechanism further includes, according to the invention, a component 23 in the shape of a hockey stick (in the embodiment described), including one end 231 for interlocking with the door. This component 23 is fixed to the carriage 12 by means of a swivelling connection 124, in such a way that the part 232 of the component 23 remains perpendicular to the bodywork plane (and therefore the door remains parallel to the bodywork) even when the orientation of the carriage 12 is modified (cf. FIGS. 1 and 2).

The component 23 provides the driven element function, driving the door. The drive element is the cable 22. These two elements are fixed by means of a pin 24, which is fixed to the cable 22 (for example by means of a screw-nut assembly or by receiving cable heads mounted at both ends of the cable in housings provided to this end), and which may travel in an oblong orifice 233 provided in the part 232 of the component 23.

In this way, when the geared motor 17 drives the cable 22, the component 23 is moved along the arrows A or B. It acts then on the carriage 12 which imposes, along the rail over its part 112, a translation along the arrows C or D. This is made possible, in a very simple way, by means of the pin 24 which moves in the oblong orifice 233, from one end corresponding to the closed position (FIG. 1) to the other end corresponding to the open position (FIG. 2).

Clearly, a number of variants are conceivable. For example, the orifice may have a slightly different shape and orientation, as may the component 23 or the support component 13. The orifice may be replaced by a slot, and the cable by another drive means, such as a belt (the geared motor then being able to be mounted directly on one of the pulleys), etc.

The invention mechanism forms a monobloc assembly, which may be added and fixed directly to the vehicle floor, and more exactly between the floor and the rocker panel (the geared motor being able to be placed in any appropriate location, for example in the vehicle trim or in the upholstery of a rear seat). There is no specific motor or actuator assembly, nor any adjustment (tension, adjustment range, etc.) to be carried out (or very little: in some embodiments, it may be necessary to assemble the pin 24). If necessary, these operations have to advantage been carried out previously, prior to the ready-to-assemble monobloc assembly being delivered.

On the vehicle assembly line, all that is needed is to install the drive unit, then to add the door. In this way assembly is made straightforward, efficient and fast.

At least two assembly types may be identified: either the component 23 is integral with the door, or it is integral with the drive unit.

In the first case, the door is fixed, by any appropriate means (welding, bolting, etc) to the end 231 of the component 23. Then this part is joined to the drive mechanism by means of the pin 24 being fitted in the orifice 233. According to one variant, there is provided on the one hand a drive mechanism, and on the other hand a carriage block, formed of the carriage and the driven element. The assembly then includes fitting the carriage block to the door. This makes it possible to leave the motor car manufacturer greater freedom in manufacturing the door (with no requirement to provide the driven element), his supplier supplying him with all the means ready to apply.

In the second case, the component 23 is added to the carriage 12, via the slug 124. Then, the pin 24 is fitted into the orifice 233. Then the door is added by fixing it to the end 231 of the component 23.

It will furthermore be noted that the height requirement and the weight of the mechanism are reduced, and fully compatible even with a small sized vehicle.

What is claimed is:

1. A drive mechanism for a motor vehicle sliding door, characterised in that at least one driven arm is arranged to be integrated to the door, the at least one driven arm having a sliding zone slidably engaging a pin that is integral with a drive element that is arranged to be integrated to a bodywork of the vehicle, the driven arm being so disposed and arranged that operation of the drive element causes the pin to move through the sliding zone to move the driven arm in a continuous notion so that the door tacks and slides between a closed position in a plane of the vehicle bodywork, and an open position in a plane approximately parallel to said bodywork plane.

2. The drive mechanism according no claim 1, characterised in that the drive element is a cable tensioned between two pulleys and driven by motorization means.

3. The drive mechanism according to claim 2, characterised in that the motorization means rotate, in two opposing directions, a coil that extends approximately perpendicular to the bodywork plane, and around which the cable is wound and unwound over a sufficient number of revolutions to open and close the door.

4. The drive mechanism according to claim 2, characterised in that at least one of the pulleys is mounted on a tensioning device to ensure cable tension above a pre-set threshold.

5. The drive mechanism according to claim 1, characterised in that the sliding zone is an oblong orifice.

6. The drive mechanism according to claim 5, characterised in that the drive element is a cable tensioned between two pulleys and driven by motorization means, and the pin includes at least one screw and one nut, gripping the cable.

7. The drive mechanism according to claim 5, characterised in that the drive element is a cable tensioned between two pulleys and driven by motorization means, and the pin includes at least one housing receiving a cable head mounted at one end of the cable.

8. The drive mechanism according to claim 1, characterised in that the sliding zone extends approximately perpendicular to the bodywork plans.

9. The drive mechanism according to claim 1, characterised by the inclusion of a guide rail arranged to be supported by the bodywork in which at least one carriage integral with the door is able to travel.

10. The drive mechanism according to claim 9, characterised in that the carriage includes at least one guide roller and/or at least one track roller.

11. The drive mechanism according to claim 9, characterised in that the carriage includes at least one interlocking element for interlocking with said door, allowing said door to be assembled during construction of the vehicle.

12. The drive mechanism according to claim 11, characterised to that the interlocking element engages with a coupling element of said driven arm.

13. The drive mechanism according to claim 9, characterised in that at least a first end of the guide rail is fixed to a support element that supports at least a portion of the drive element.

14. The drive mechanism according to claim 13, characterised in that a second end of the guide rail is fixed to at least one second pulley.

15. The drive mechanism according to claim 13, characterised in that it forms a monobloc assembly, ready to be fitted in a vehicle without need for adjustment.

16. A motor vehicle sliding door including a carriage block for receiving at least one driven arm designed to engage with the pin of the drive mechanism according to claim 1.

17. A motor vehicle including at least one drive mechanism according to claim 1.

* * * * *